June 30, 1964  G. BALES  3,139,110
VALVED FLUID COUPLING
Filed Oct. 9, 1958  3 Sheets-Sheet 1

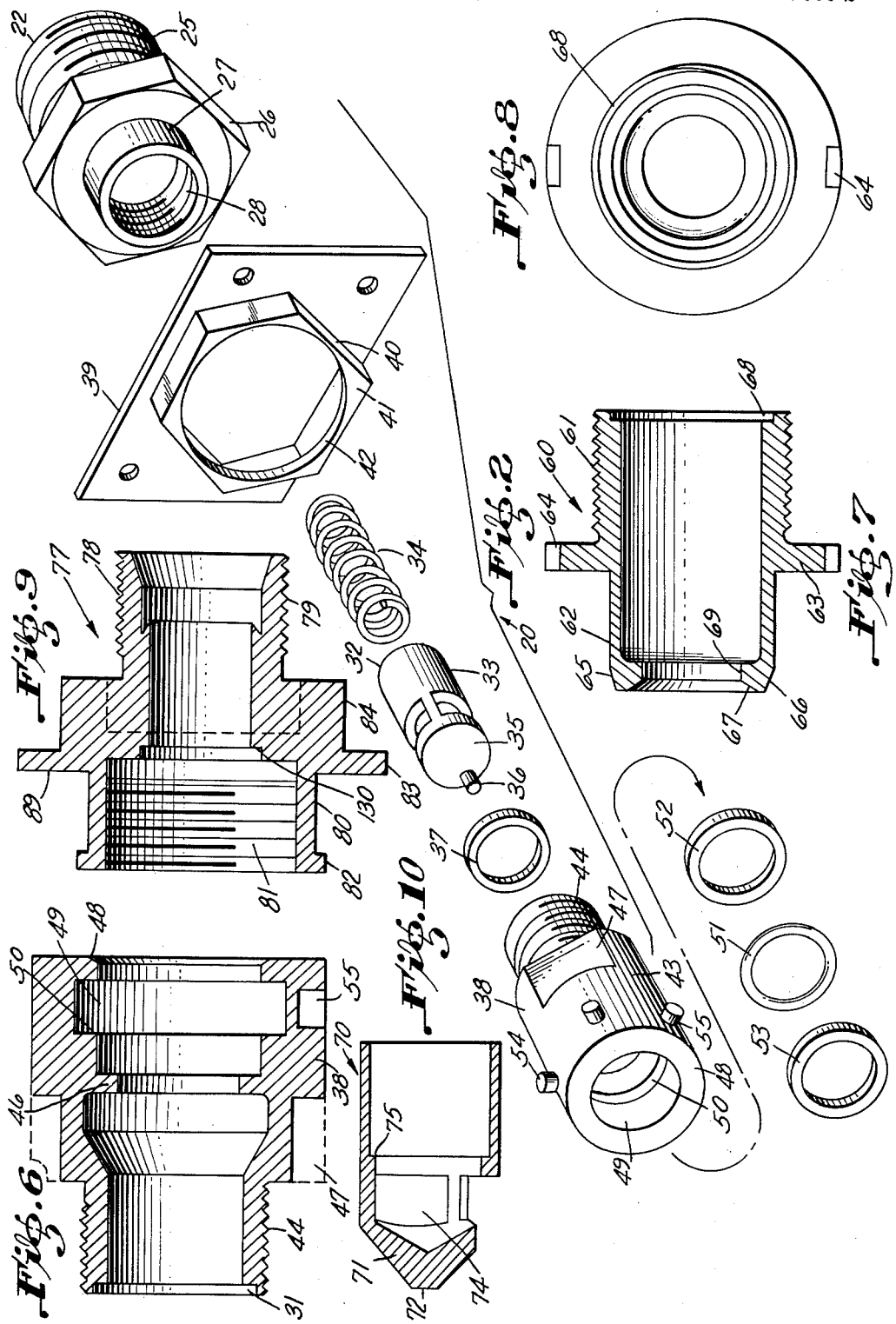

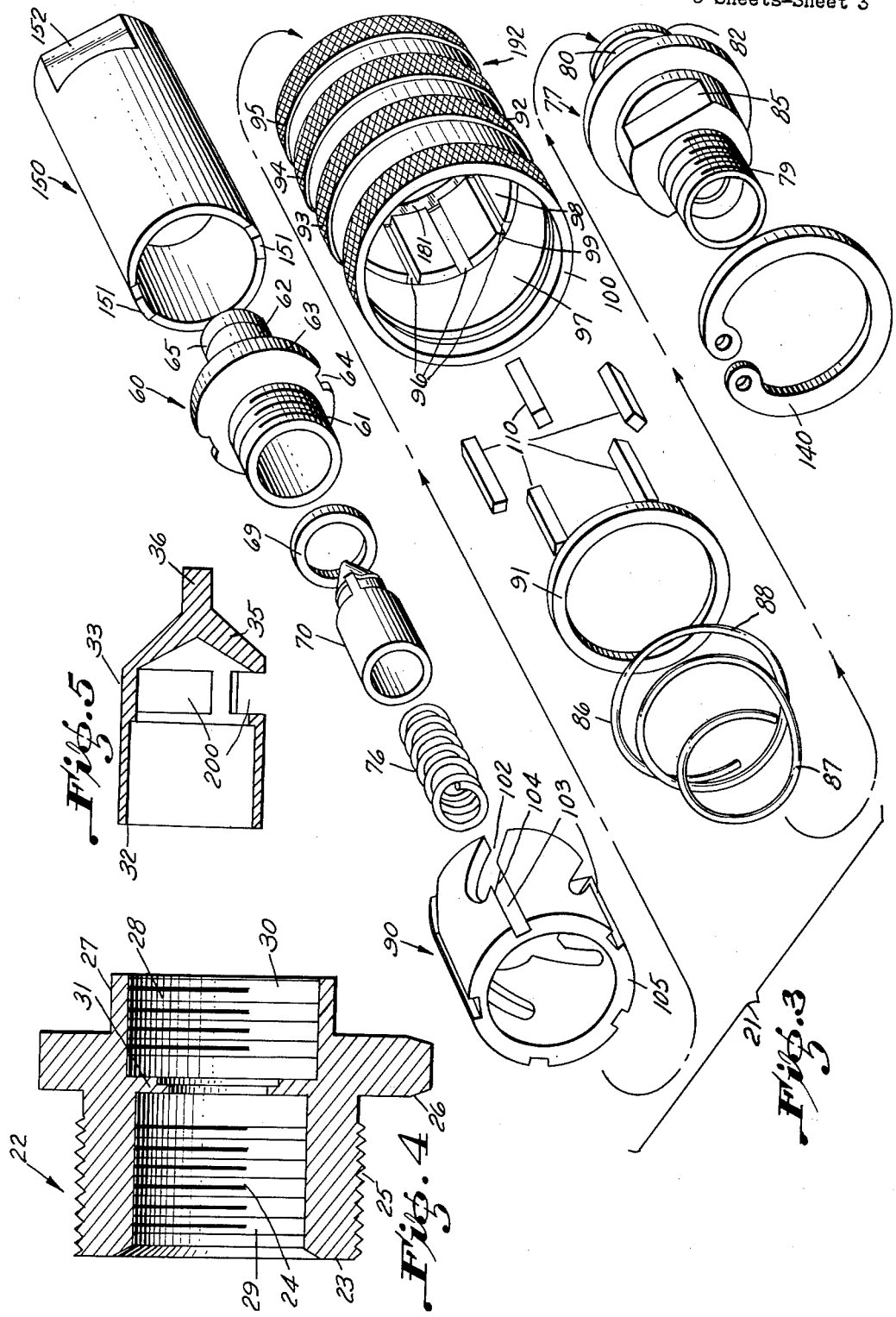

3,139,110
VALVED FLUID COUPLING
George Bales, Baldwin, N.Y.
Filed Oct. 9, 1958, Ser. No. 768,517
2 Claims. (Cl. 137—614.04)

This invention relates to a valved conduit coupling for quickly connecting and quickly disconnecting associated conduit members of hydraulic systems, and said coupling is capable of functioning properly in such hydraulic systems which handle fluids under pressure up to approximately 5000 p.s.i. and at temperatures up to approximately 400° F., said coupling being self-sealing and being capable of being disconnected with one hand by a single operational movement and being capable of being connected by a single operational movement and with one hand. The coupling of this invention is so constructed that both the coupling operation and the valve-opening operation, on one hand, and that both the uncoupling operation and the valve-closing operation, on the other hand, are each performed simultaneously with one continuous operation.

The coupling includes a pair of coupling members each having a fluid passage therethrough and a self-closing poppet member for opening the passage to fluid upon joining the coupling members and for closing the passage upon separation of the coupling members. In combination with and mechanically associated with and related to said self-closing poppet members is a locking means operative simultaneously with said poppet members. This locking means includes operating members on each of said coupling members, one being the female coupling member and the other being the male coupling member.

The female coupling member comprises a cylindrical open-ended sleeve having a plurality of inclined and curved circumferentially spaced slots through the walls thereof and vertically extending keyways on the outer wall surface thereof, said keyways extending from the bottom end and terminating at the respective slot edges, and said sleeve rests on and is supported by a washer which, in turn, is positioned upon a compression spring member. The poppet member of said female member is contained in a tube body positioned within and concentric with respect to said slotted sleeve and has a compression spring positioned therewithin for holding its conical portion in seated position. Positioned about the tube containing this poppet member, this tube consisting of the tube body and tube end, and intermediate the said two ends thereof is the compression spring bearing against the bottom surface of said washer upon which said slotted or cam sleeve and said pins or cam locks rest. Positioned about the foregoing described assembly is a housing assembly including a housing member and a sleeve therewithin at its top portion, which assembly has for a length of its inner surface a plurality of circumferentially spaced keyways, each pin or cam lock being held in its respective keyway by said housing sleeve, the bottom of which forms a retaining shoulder.

The male coupling member comprises a bulkhead having positioned therein a self-closing or self-sealing poppet member which is hollow and has positioned therein a compression spring for holding the conical portion thereof in seated position. On the outer surface of the bulkhead body and attached thereto are laterally extending stud members, the number of stud members being the same as the number of said inclined and curved circumferentially spaced slots in said cylindrical open-ended sleeve of said female coupling member.

Further, with respect to said female coupling member, movably positioned in and retained, on one hand, in each of the vertically extending keyways in the outer surface of said cylindrical open-end sleeve having said spaced slots is a pin or cam lock which rests on and is supported by said washer upon which said slotted sleeve of the female coupling member rests. On the other hand, each of said pins or cam locks or detent members are also movably positioned and retained in the aforementioned keyways in the inner surface of said housing member, the number of keyways in said housing member inner surface being equal to the number of keyways in the outer surface of said slotted sleeve, each of said sleeve keyways being oppositely positioned to each of said housing member keyways. Each pin or cam lock or detent member is held in its respective keyway in the housing member, on one hand, and in its respective keyway in said slotted sleeve member by said aforementioned housing sleeve, the bottom of which forms a retaining shoulder for preventing each of said pins from leaving the assembly. Thus, said pin or cam locks or detent members are all movable with respect both to the housing member and to the slotted cam sleeve of the female coupling member and do not necessarily move into and out of position with said outer housing.

In operating the coupling, the stud members of the male coupling member are inserted into the slots of said cam sleeve of said female coupling member and contact the respective pins or cam locks which are, in turn, urged through the medium of the washer upon which they rest against the compression spring. Said studs upon reaching the bottom of the respective slots thereby allow said pins or cam locks to be urged towards the male coupling member by said compression spring to confine the studs in the respective slots. Also, the respective poppet members of the male and female coupling members of the said male and female coupling members will contact each other, and each will move, simultaneously with the locking action, from its respective seat. Of particular note is the fact that the housing member moves independently of the remaining assembly and that each pin or cam lock or detent member is capable of movement independently, and does move independently, of the housing member and of the cammed sleeve member. Also, by moving the housing along the coupling axis away from the male coupling member, the pins or cam locks will be caused to be urged against the washer and compression spring, thereby compressing said spring while the slotted sleeve remains fixed, thereby enabling the studs on the male coupling member to move out of their respective slots. Further, because of the fact that the pins or cam locks do move independently of said housing member and also of the cammed sleeve and are not integral therewith, the locking or the confining of the stud members of the male coupling can be brought about, especially when the male coupling is in fixed position, by urging, pushing or moving forcefully, with one hand if necessary during an emergency, the female coupling member towards and around the male coupling member thereby to enable the studs to be confined in the respective slots of the cammed sleeve. Thus, it is seen that the studs on the male coupling member are capable of movement into or out of their respective slots, and the spring-loaded poppets will again become seated or unseated in their respective positions. It is also to be particularly noted that the structure here is such that the poppet assembly, including the tube, is capable of being rotated without the accompanying rotation of any other part while the coupling members are in locked position. Neither force applied on the conduit members here connected by the coupling nor vibration will cause the coupling members to be pulled apart.

Here, the coupling of this invention includes a cam sleeve and cam locks or pins both positioned on and supported on the washer supported by a compression spring, said cam locks or pins being movable independent of the outer housing therearound and being guided in the keyways in the inner surface of said outer housing, thereby enabling upward movement of the cam sleeve without accompanying movement of the pins or cam locks and movement of said pins without accompanying movement of the outer housing. As is quite evident, the coupling here is light in weight of relatively small size, and has a minimum number of parts.

Heretofore, hydraulic systems handling fluids under pressures up to 5000 p.s.i. at temperatures as high as 400° F. have included valved couplings generally referred to as quick-disconnect coupling devices. However, such heretofore known coupling devices have been so constructed that they were too burdensome and difficult to manipulate in connecting and disconnecting the respecting male and female members thereof. Also, they have been so constructed that under the high pressures and temperatures of the fluids passing therethrough substantial leakage has developed at the coupling device. Now, with the advent of the missile age accompanied by the strict requirements against leakage under operating conditions calling for passage of fluids at high temperatures and pressures, an easily operable valved coupling device has become necessary which can be immediately connected and disconnected by any individual by a single manipulation not requiring any amount of substantial skill. This coupling device must be light in weight, small, compact, thoroughly efficient, and easily and economically manufactured. The coupling of this invention meets all of the aforementioned requirements.

An object of this invention is to provide a valved coupling for quickly connecting and disconnecting conduit members associated with the respective female and male members of said coupling, said conduit members and said associated coupling being components of hydraulic systems and handling fluids under pressures up to and including 5000 p.s.i. at temperatures up to and including 400° F. without any fluid leakage therethrough when the conduit members are so connected.

Another object of this invention is to provide a valved conduit coupling having positive locking means and capable of being placed in locked position when either the male or female coupling member is fixed merely by moving one of said coupling members into engagement with the other coupling member without applying any unusual force or forces to the outer housing member of said coupling about the coupling member having said housing therearound.

Another object of this invention is to provide a valved conduit member having a positive locking means including a cam sleeve and a plurality of cam locks, said cam locks being guided both in the inner surface of a coupling member housing and in the outer surface of said cam sleeve, whereby said cam locks are capable of movement independent of said housing and said cam sleeve.

Other objects and features of this invention will become apparent from the following detailed description which is not limiting but is illustrative of the preferred embodiment of this invention.

FIGURE 1 is a sectional view of the valved conduit coupling in closed position taken on line B—B of FIGURE 1a.

FIGURE 2 is an exploded view of the male coupling member of the valved conduit coupling of FIGURES 1 and 1a.

FIGURE 3 is an exploded view of the female coupling member of the valved conduit coupling of FIGURES 1 and 1a.

FIGURE 4 is a longitudinal sectional view of the bulkhead end of the male coupling member shown in FIGURE 2.

FIGURE 5 is a longitudinal sectional view of the poppet member of the male coupling member shown in FIGURE 2.

FIGURE 6 is a side view of the bulkhead body assembly.

FIGURE 7 is a side view of the tube body seen in FIGURE 3.

FIGURE 8 is an end view of the tube body as seen looking from the right side of FIGURE 7.

FIGURE 9 is a sectional view of the tube end of the female coupling member.

FIGURE 10 is a sectional view of the poppet member of the female coupling member shown in FIGURE 3.

Like numerals designate similar component parts.

Figure 1A:
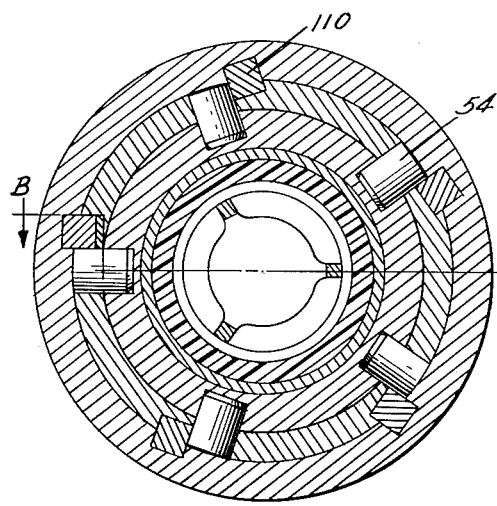
FIGURE 1a is a sectional view taken on line A—A of FIGURE 1.
Figure 1:
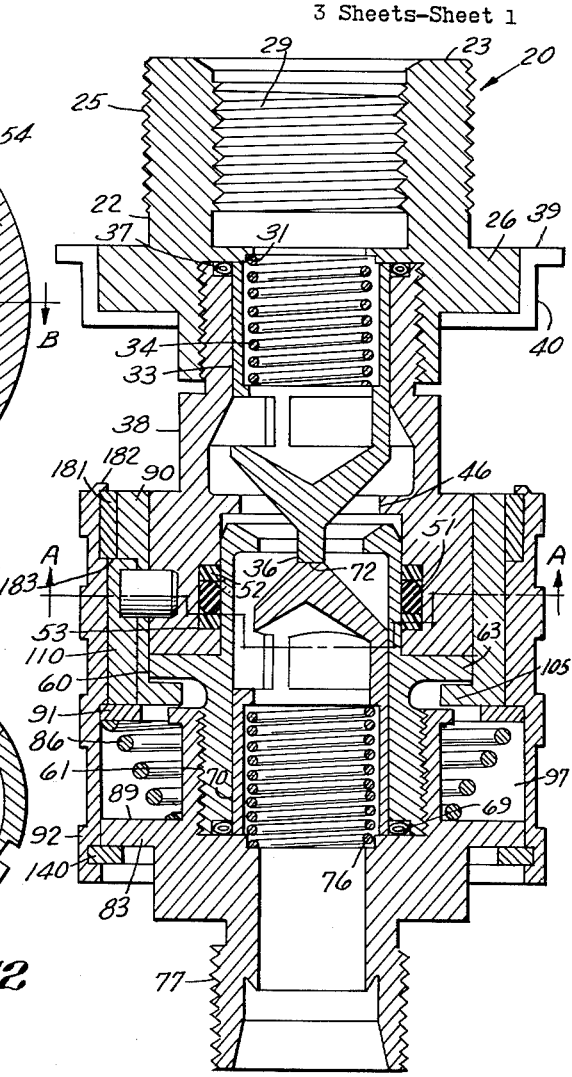

More specifically, the valved conduit coupling of this invention consists of a male coupling member 20 and a female coupling member 21, said coupling being shown in closed position in FIGURES 1 and 1a of the drawings.

The male coupling member 20 includes a hollow cylindrical bulkhead end member 22 having an internally threaded portion 24 and an externally threaded portion 25 in its outer end 23. Integral with said outer end 23 is a hexagon-shaped portion 26. Said bulkhead end member 22 has at its inner or outer end a cylindrical portion 27 having an internally threaded portion 28. The said internally threaded portion 24 defines a port 29, and the said internally threaded portion 28 defines a port 30. The cross-sectional area of said port 30 is larger than the cross-sectional area of said port 29. Port 30 is provided, at its inner end, with a depending seat flange portion 31 for receiving one end 32 of the self-closing and self-sealing poppet member 33 which, as clearly shown in FIGURE 5, is hollow. Said poppet member 33 has through its wall portion the ports 200, 200, as clearly shown in the appended drawings.

Positioned within said poppet member is compression spring 34 which also bears against flange 31, as clearly shown in FIGURE 1. Opposite to end 32 of poppet member 33 and part thereof is conical portion 35 having integral therewith nipple 36. A seal ring 37 for poppet member 33 adjacent to end 32 thereof is provided to be positioned in the outer end portion of the bulkhead body 43.

Provided for overlapping reception of the corresponding shaped portion 26 of bulkhead end 22 is flange 39 having a hexagonally shaped sleeve portion 40, and integral with and perpendicular to said sleeve portion 40 is web 41 provided with a circular sleeve 42 through which the cylindrical portion 27 of bulkhead end 22 is extended. Portion 26 is, in the assembled position, restrained against further movement when seated within sleeve 40, as is clearly shown in the drawings.

Bulkhead body assembly 38 includes the substantially cylindrical body 43 having a step-down reduced portion having an externally threaded portion 44. Said substantially cylindrical body 43 is provided with an integrally formed circular opening flange 46 intermediate its ends for receiving said conical portion 35 of poppet member 33 and is also provided with a recessed cut out portion 47.

At its other end, body 43 is provided with a circular flange portion 48 integral therewith. Internally formed in said bulkhead body 43 and adjacent said flange 48 is recessed portion 49 whose walls are defined by the end wall 50 and said flange 48, as clearly shown in FIGURE 6. O-ring 51 positioned between back-up rings 52 and 53 is received within recess 49, as clearly shown in FIGURE 1. Fixedly secured in each of the circumferentially spaced cylindrically shaped holes 55 in the outer surface wall of bulkhead body 43 is a laterally extending cylindrically shaped stud member 54.

To assemble the male coupling member 20, the cylindrical portion 27 of the bulkhead end is inserted through sleeve 42 to place hexagon portion 26 engagedly within the hexagonally shaped sleeve portion 40 and in abutting relationship with web 41. Compression spring 34 is placed into the poppet member 33 and is received within bulkhead body assembly 38, O-ring 51 and its associated back-up rings 52 and 53 having been positioned within recess 49 and seal 37 being positioned against seat 31. Bulkhead body assembly 38 is then connected to bulkhead end 22 by threadedly engaging reduced portion 44 with internally threaded portion 28 defining port 30, as clearly evident from the exploded view shown in FIGURE 2.

Female coupling member 21 includes tube 60 provided with threaded portion 61 at one end thereof and externally stepped-down portion 62 at the other or outer end thereof, as clearly shown in FIGURE 7. Spaced intermediate the ends of tube body 60 and separating portions 61 and 62 is substantially circular flange member 63 provided with diametrically oppositely positioned cut-out portions 64. Portion 62 is provided with a reduced beveled section 65 provided with an integrally formed internal flange 66 beveled at 67, as clearly shown in FIGURE 7. Opposite or threaded portion 61 is provided at its extreme end with recessed seat portion 68 to receive seal ring 69. Flange 66 provides a seat for poppet member 70.

Poppet member 70 is provided, at one end thereof, with a substantially conically shaped portion 71 formed with flattened nose 72. In coupling position of the valved conduit coupling nose 72 abuts and reacts against nipple 36, as clearly shown in FIGURE 1. Poppet 70 is provided with ports 73 and 74 for passage of fluid therethrough. Intermediate its ends, poppet member 70 is internally recessed at 75 to provide an abutment for compression spring 76. The internal recess 75 extends outwardly to end opposite nose 72, as clearly shown in FIGURES 1 and 10.

The outer end of female coupling member 21 includes tube end 77 having external threads 79 at its smaller outer end 78 and internal threads 81 at its inner larger end 80, as clearly shown in FIGURES 3 and 9. Inner end 80 has integral therewith laterally extending outer flange 82 as will hereinafter be more fully described.

Intermediate its ends tube end 77 has integral therewith laterally outwardly extending flange 83 formed with step-down reduced portion 84 which is cut away as at 85 to provide diametrically opposed wrench flats to accommodate a wrench for assembling and disassembling the coupling member, as clearly shown in FIGURES 3 and 9. Seat 130 is provided on the outer face of the innermost end of reduced portion 84.

Spring 86 is provided to act in compression between flange 83 and cam or slotted sleeve member when in assembled position. Spring 86 is provided at one end thereof with smaller diameter end 87 which is placed in seated position against inner face 89 of flange 83 and with an end 88 having a diameter larger than end 87 for action against ring washer 91 which, in assembled position, is seated with the female coupling member housing member 92.

Figure 13:
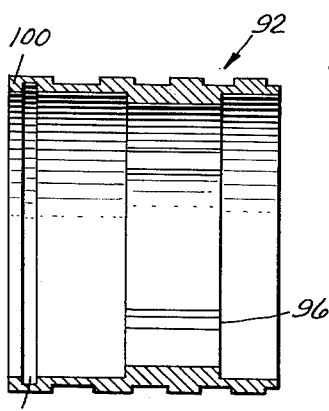
FIGURE 13 is a sectional view of the outside housing member of the female coupling member shown in FIGURE 3.
Figure 14:
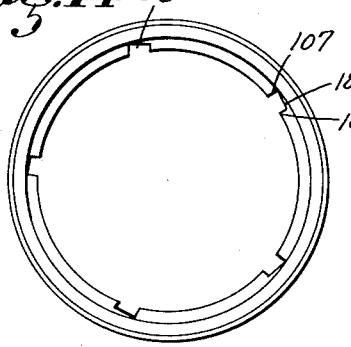
FIGURE 14 is an end view of the outside housing member as seen looking from the right side of FIGURE 13.

Female coupling member housing assembly 192 includes housing member 92 and sleeve 181 securely positioned therewithin at the top portion of said housing member 92 as clearly shown in FIGURE 1 and held from moving out of said member 92 by the bent-over portion 182. Housing member 92 is provided with laterally outwardly extending knurled collars 93, 94, and 95 for gripping and handling purposes and is an open ended cylindrical body having a plurality of circumferentially equispaced keyways 96 in section 98 on the inner surface thereof, section 98 extending from the bottom surface 183 of sleeve, said bottom surface 183 abutting the top surface of section 98, to the beginning of internal elongated channel 97 of said housing member 92. The bottom wall 184 of each of said keyways 96 connecting the respective side walls 106 and 107 thereof is inclined with respect to the housing member 92, as clearly shown in FIGURES 13 and 14. Compression spring 86, in the assembled coupling, is positioned within channel 97, as clearly shown in FIGURE 1, said channel 97 being defined by inner wall 99 of section 88 and flange 100 on the end of housing 92 and integral therewith, as clearly shown in FIGURES 3 and 13. Circumferentially positioned lower channel 101 is provided within channel 97 adjacent to flange 100 providing one end thereof.

Figures 11, 12:
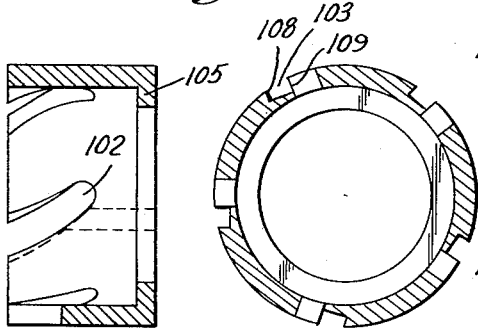
FIGURE 11 is a sectional view of the cam or slotted sleeve of the female coupling member shown in FIGURE 3.
FIGURE 12 is a side view of the cam or slotted sleeve as seen looking from the left side of FIGURE 11.

Cam sleeve member 90 is a cylindrical open-ended member having, at one end portion thereof, a plurality of inclined and curved circumferentially or helically curved, equispaced slots 102 through the wall thereof and a plurality of vertically extending keyways 103 on the outer surface of the other end portion thereof. Keyways 103 extend from the end, opposite to that end in which slots 102 are formed, and each of said keyways 103 terminates in a slot 102 cooperating therewith as at 104. Cam sleeve member 90 has at its end opposite to the end having slots 102 therethrough an integral depending flange 105 substantially perpendicular to its longitudinal axis, as clearly shown in FIGURE 11. The spacing between each of keyways 96 and each of keyways 103 is substantially the same in each of the respective members 92 and 90, and, as clearly shown in FIGURES 14 and 12, each of keyways 96 and 103 is similarly formed at an angle with respect to the longitudinal axis of the respective members 92 and 90 so as to facilitate the locking of said pins or cam locks 110 against movement of said member 92 away from cam sleeve 90 upon the insertion therebetween of said cam locks 110 in their respective keyways 96 and 103. Keyway or guideway 96 has a vertical side wall 106 shorter than its opposite side wall 107, as is clearly shown in FIGURE 14, and keyway 103 has a vertical wall 108 of less depth than the opposite vertical side wall 109.

Of particular note, upon the mating of the male coupling member 20 with the female coupling member 21, the smaller wall 106 of each keyway 96 will be in alignment with the larger vertical wall 109 of each keyway 103, and each stud member 54 is cylindrical shaped and is not required to be sloped for proper positioning. The number of keyways 96 in housing member 92 is equal to the number of keyways 103 it cam sleeve member 90.

As is quite evident, a separate and distinct pin or cam lock 110 is provided to be received within each pair of keyways 96 and 103 and moves independently of both the housing member 92 and the cam sleeve member 90.

In assembling the components of female coupling member 21 as clearly shown in FIGURE 3, tapered compression spring 86 has its smaller end 87 seated against inner face 89 of flange 83 of tube end 77. Ring washer 91 is positioned against end 88 of spring 86. Cam locks or pins 110 are then inserted in each keyway or guideway 96, and cam sleeve 90 is then positioned within housing member 92 in such a manner that each cam lock 110 is positioned in its respective keyway 103 of cam sleeve 90. Thusly, housing member 92 and cam sleeve 90 are each capable of coaxial movement with respect to each other, and said cam locks 110 are capable of axial movement with respect to both housing member 92 and cam sleeve 90. Tube end 77 is then positioned with housing member 92 with ring washer 91 bearing against internal wall 99. Snap ring 140 is then positioned in lower channel 101 for locking the foregoing components in position to prevent separation from the left side as clearly shown in FIGURES 1 and 3. The components heretofore assembled are then positioned in a vertical upright position with snap ring 140 being the lowermost part of said subassembly within housing member 92. Spring 76 is positioned within poppet member 70 which is then placed within tube end 77 to react against face 130 of reduced portion 84. Seal ring 69 is mounted over and about poppet member 70 and within said assembly against reduced portion 84, as clearly shown in FIGURES 1 and 3. Threaded portion 61 of tube body 60 is engaged with threaded portion of end 80 of tube end 77. The members are then tightened until seat 68 abuts seal ring 69 and flange 63 of tube body 60 retains cam sleeve 90 by engagement with the inner face of flange 105 of cam sleeve 90. As is quite evident, wrench 150 provided with depending lugs 151 is used to tighten the members together in assembled position by inserting lugs 151 into the cut out portions 64 in flange 63 of tube body 60.

Wrench 150 is also provided with diametrically opposed cut out portions 152 for application of other wrench devices as might be required.

As is quite evident from the foregoing description the relation between the component elements is such that the housing assembly 192 can slide longitudinally with respect to the other set forth components, with particular reference to cam locks 110 and cam sleeve 90, within limits defined by compression spring 86 and cam locks 110.

As is further quite evident, after the coupling has been assembled and is in its normal operating position before the male and female coupling members are connected, as will hereinafter be described, the ports and openings for passage of fluid are sealed by the normal inactive position of the poppet members. Upon connecting said male and female coupling members, nose 72 of poppet member 70 displaces, and is displaced by, nipple 36 of poppet member 33, inwardly of each coupling member thereby to permit the passage of fluid through the coupling in its operating condition.

To connect the respective conduit members (not shown) to which the male coupling member 20 and the female coupling member 21 are respectively attached, cylindrically shaped stud members or pins 54 are inserted in slots 102 of cam sleeve 90 and contact the respective cam locks 110 urging said cam locks 110 against compression spring 86 through ring washer 91. In many instances, male coupling member 20 is fixedly secured to a bulkhead wall (not shown) by means of flange 39, and female coupling member 21 is urged or moved towards male coupling member 20. Because the cam locks 110 are movable independently of housing member 92 and cam sleeve 90, one forceful simple movement only of the female coupling member 21 towards and about the male coupling member is required to bring about the positive locking action between the two coupling members. Upon the stud pins 54 reaching the bottom of their respective slots 102, cam locks 110 are urged in a direction opposite to the movement of stud pins 54 to confine said stud members 54 within their respective slots, thereby bringing about a positive locking action. Said poppet members of said male and female coupling members, respectively, contact each other through the flattened nose and nipple, respectively, to displace each other inwardly simultaneously with the locking action thereby allowing the passage of fluid through the conduits and said coupling.

As hereinabove pointed out, housing assembly 192 moves independently of the remaining assembly of the female coupling member 21 as do the cam locks 110. Also by moving the housing assembly 192 along the coupling axis away from male coupling member, and the stud pins 54 on the male coupling member will move out of their respective slots 102, and the spring loaded poppet members will then return to their inactive seated position to cut off the passage of fluid in the system. Again, it is to be particularly noted that the arrangement of component elements hereinbefore described is such that the cam locks 110 can be moved independently of and relative to the housing assembly 92 because of the all important fact that the cam locks 110 are not integral with either washer 91 or the housing assembly. As is thus quite evident, this invention thus corrects a vital defect found in the valved conduit couplings of the prior art in that it obviates the necessity for moving the outer housing of the female coupling away from the male coupling while urging the male coupling towards the female coupling in order to lock the valved coupling in its active or operating condition. This alone saves precious and valuable time in the locking, and unlocking, process especially during an emergency situation. It is thus further obvious that washer 91 and cam locks 110 will move in the operation of the coupling without any substantial accompanying movement of outer housing 92.

Further, as is quite evident here, the arrangement of structure hereinbefore set forth allows for rotation of the poppet assembly including the tube body 60 and the tube end 70 without rotation of any other part and this while the coupling members are in locked position with fluid passing through the system including the coupling device.

Also of particular note is the fact that the cam locks 110 are not carried by the housing 92 but are guided in said housing 92 and the cam sleeve 90 in the respective keyways 96 and 103 thereof thus making it possible for any unskilled individual to manipulate the housing 92 and connect or disconnect the coupling with one hand within a matter of seconds.

Many changes and alterations may be made without departing from the spirit and scope of this invention which is set forth in the appended claims which are to be construed as broadly as possible in view of the prior art.

I claim:

1. A quick disconnect valved conduit coupling comprising a male coupling member and a female coupling member, said male coupling member including a bulkhead assembly provided with laterally outwardly extending cylindrically shaped stud pins and having a longitudinal bore fluid passage therethrough for receiving a self-sealing poppet valve having a compression spring means mounted therein for normally urging said poppet into a closed seated position when said coupling members are separated, said female coupling member including a cylindrically shaped housing assembly provided with internal keyways, a cylindrical open-end cam sleeve member positioned within said housing assembly provided with external keyways for cooperative association with said housing assembly internal keyways and a plurality of inclined and curved circumferentially spaced slots through the walls of at one end of said cam sleeve member, cam lock means for operatively connecting said cam sleeve member and housing for longitudinal sliding movement therein, said cam lock means including a plurality of individual spring loaded cam locks each movable independently of said housing assembly and said cam sleeve member, each of said cam locks being positioned in both an internal keyway of the housing assembly and its associated external keyway of said cam sleeve member, a ring washer seated within the housing assembly intermediate the respective ends thereof, said cam sleeve member and each of said individual cam locks movable independently of said cam sleeve member being supported on said ring washer, and a tube end mounted within said housing assembly and a tube body mounted within said housing assembly for receiving a second poppet member having spring means acting between said second poppet member and said tube end for normally urging said second poppet member into a closed seated position therein when said coupling members are separated, compression spring means mounted about at least a portion of said tube end and said tube body for receiving said second poppet member and acting against the ring washer and the cam locks for normally urging said cam locks into a seated position into the associated slots in said open-end cam sleeve member, said male and female members being connected together by cooperative engagement of said bulkhead stud pins in said cam sleeve member slots.

2. The quick disconnect valved conduit coupling of claim 1 wherein the number of housing assembly internal keyways is equal to the number of cam sleeve member external keyways.

References Cited in the file of this patent
UNITED STATES PATENTS

| | | |
|---|---|---|
| 767,843 | Smith | Aug. 16, 1904 |
| 2,185,173 | Fortune | Jan. 2, 1940 |
| 2,509,444 | Mitchell | May 30, 1950 |
| 2,804,319 | Weber | Aug. 27, 1957 |
| 2,889,158 | Hughes-Caley | June 2, 1959 |